United States Patent Office.

GOLDSBURY HARDEN POND, OF GLEN'S FALLS, NEW YORK.

BLEACHING WOOD PULP AND OTHER FIBROUS MATERIALS.

SPECIFICATION forming part of Letters Patent No. 321,452, dated July 7, 1885.

Application filed October 13, 1884. (No specimens.)

*To all whom it may concern:*

Be it known that I, GOLDSBURY HARDEN POND, a citizen of the United States, residing at Glen's Falls, in the county of Warren and the State of New York, have invented certain new and useful Improvements in the Process of Bleaching Wood Pulp, Textile Goods, and other Fibrous Material by the use of Oxygen; and I do hereby declare that the following is a full, clear, and exact description of the invention, which will enable others skilled in the art to which it appertains to make and use the same.

The object of my invention is the process of bleaching wood pulp and any other material of a fibrous nature with oxygen in a quick, efficient, and economical manner; also to produce white pulp for the manufacture of paper from various fibrous substances, primarily wood pulp and other fibrous material not in use for that purpose owing to the inability of bleaching it white on a commercial scale; also to reduce the cost of the process of bleaching wood pulp white.

All kinds of wood pulp and any other fibrous material can be bleached white expeditiously and economically without materially injuring the most delicate fibers of the material of which these goods are composed.

Heretofore bleaching has been done on a commercial scale principally with chlorine or some of the chlorides, although in some cases ozone has been applied to the science, and on some classes of goods sulphuric-acid gas is used. Neither the chlorine process nor any of the chlorides in the various ways they are used will bleach white wood pulp without many repetitions of the process and a partial destruction of the fiber. Wood fiber, excepting what is called "chemical pulp," will not bleach whiter than a light yellow or cream color by any other known process without decomposition taking place and an entire destruction of the fiber.

To carry my invention into effect, I use metallic oxides with chlorine or any other substance or solution that will yield oxygen by the action of these metallic oxides, depending entirely in this process upon the generation of oxygen in contact with the material to be bleached, either in air or in a bath of any substance which may be compatible with a bleaching operation, and which is capable of yielding up its oxygen through the agency of a metallic oxide. In this solution wood pulps and any other fibrous material to be bleached are thoroughly wet or mixed therein, thereby bringing into a close and positive contact the material to be bleached and the innumerable points of generation of the oxygen. To accomplish these results I prepare a bath of weak solution or mixture of any metallic oxide mixed with water—such as the oxide of iron, copper, zinc, lead, nickel, or cobalt. I prefer the oxide of iron and zinc to all others. In using the oxides they are mixed with water, and are then thoroughly mixed with the material being bleached, so that the fibers thereof are completely covered with it, the metallic particles being deoxidized and oxidized to an unlimited extent, thereby developing a large quantity of oxygen.

In bleaching wood pulp and any other material of a fibrous nature—such as hemp, jute, flax, cotton, or the waste of any of these—for the manufacture of paper I take the common bleaching tank or engine now in general use in paper-making, fill it partly full with water and with the metallic oxides mixed therein in the proportions of one pound of the oxide to one hundred pounds of the material to be bleached, this proportion being varied according to the amount of oxygen required; then add a quantity of the solution of either chloride of lime or chlorine water, or any other solution capable of yielding oxygen by the action of the metallic oxides. I then fill the tank or the engine to its working capacity with the wood pulp, heating with steam to nearly a boiling point. The beating-roll by its revolution mixes thoroughly the pulp with the solutions of chlorine or chloride of lime and the metallic oxides therein, when by the action of the heat large volumes of oxygen are produced within the mass of the pulp and in contact with each fiber thereof, and as the oxygen is generated the bleaching is immediately effected. After the bleaching is completed the whole mass of the wood pulp is acidulated with dilute acid, decomposing the oxides, which are then washed out in combination with the acid, leaving the pulp clean and perfectly white.

Chlorine-gas or water saturated with chlorine, or any solution susceptible of yielding oxygen by the action of the metallic oxides, may be used and mixed, in the same manner as hereinbefore described, with the pulp, water, and oxides in the bleaching-engine, and treated in the same manner, and when heated the same results will follow and a large volume of oxygen will be generated, and when in contact with various fibrous materials and the wood pulp bleaching it to a permanent white in a few minutes.

To accelerate the process of bleaching, more metallic oxide can be added at any time during the operation.

It is a well-known fact that in the use of chlorine when it is heated it leaves its solution and goes off into the air. In this process the oxygen is not formed and the bleaching is not accomplished unless heat is applied and the chlorine or other solution or mixture containing oxygen brought into contact with the metallic oxide. The nearer to but under the boiling-point this process is operated the more voluminous will be the generation of the oxygen, and the more efficient and immediate will be its bleaching properties.

I do not limit myself to the use of chlorine as the source of oxygen to be used in this bleaching process. Any other source compatible with the operation of bleaching and the material to be bleached which will give up its oxygen by the action of the metallic oxides may be used; but the oxygen must be generated in contact with the materal to be bleached either in the air or in the bath.

When the metallic-oxide bath is used in and preparatory to, or as the first part of, the process of bleaching, it will completely protect the most delicate fibers of the material being bleached from the destructive action of the bleaching process, thoroughly preventing the weakening of the fibers by the chemical action, leaving the fibers intact with all the strength of the unbleached material. The metallic-oxide bath is important in this process in its twofold capacity, first, for protecting the fibers from decomposition and deterioration by the chemical action during the process, and, second, as the source of the oxygen or the agency through which it is developed from solutions and substances containing it.

Having fully described my invention, what I desire to claim, and secure by Letters Patent, is—

1. The process of bleaching wood pulp and other fibrous material by the generation of oxygen in contact with it in a bath of metallic oxides in water, substantially as described.

2. The process of bleaching wood pulp and other fibrous material in an oxide bath by the generation of oxygen within the mass of fibers of the material and in actual contact with the innumerable points of generation of the oxygen, as herein set forth and described.

3. The process of bleaching wood pulp and other fibrous material in air under heat by the generation of oxygen within the mass of fibers of the material and in contact with the points of generation of the oxygen, substantially as described.

4. The process of bleaching wood pulp and any other fibrous material within a metallic-oxide bath with chlorine added, whereby oxygen is generated and the bleaching effected while the oxygen is being developed, as herein set forth.

5. The transformation of chlorine and water or other solutions by metallic oxide into oxygen in a bath or in the air under heat in contact with wood pulp or any other fibrous material producing oxygen, thereby bleaching the fibrous material, substantially as herein described.

6. The decomposition of metallic oxides, producing oxygen, with chlorine or any other solutions containing oxygen in a bath or in the air under heat and in contact with wood pulp or any other fibrous material generating large volumes of oxygen, thereby bleaching the fibers of the pulp, &c., substantially as herein set forth and described.

7. The formation of large volumes of oxygen by the agency and action of chlorine or other substances with metallic oxides in a bath or in the air in contact with wood pulp or any other fibrous material while under heat, thereby bleaching the material with the oxygen as it is developed in contact with the textile or fibrous material, as herein fully described and set forth.

8. In a process of bleaching, the use of a metallic-oxide bath for the protection and preservation of the fibers of the material from decomposition, preventing the strength of the fibers from being weakened while exposed for any length of time to the action of the bleaching process, substantially as set forth.

9. In a process of bleaching with oxygen, the use of a metallic-oxide bath for the purpose of generating oxygen, and also for the complete and positive protection of the fibers of the material from being weakened or decomposed during the process of bleaching.

GOLDSBURY HARDEN POND.

Witnesses:
EDMUND A. MORSE,
EMMET T. JOHNSON.